Aug. 6, 1929.  R. B. CLARK  1,722,502
COTTON CHOPPER
Filed June 28, 1928   2 Sheets-Sheet 2
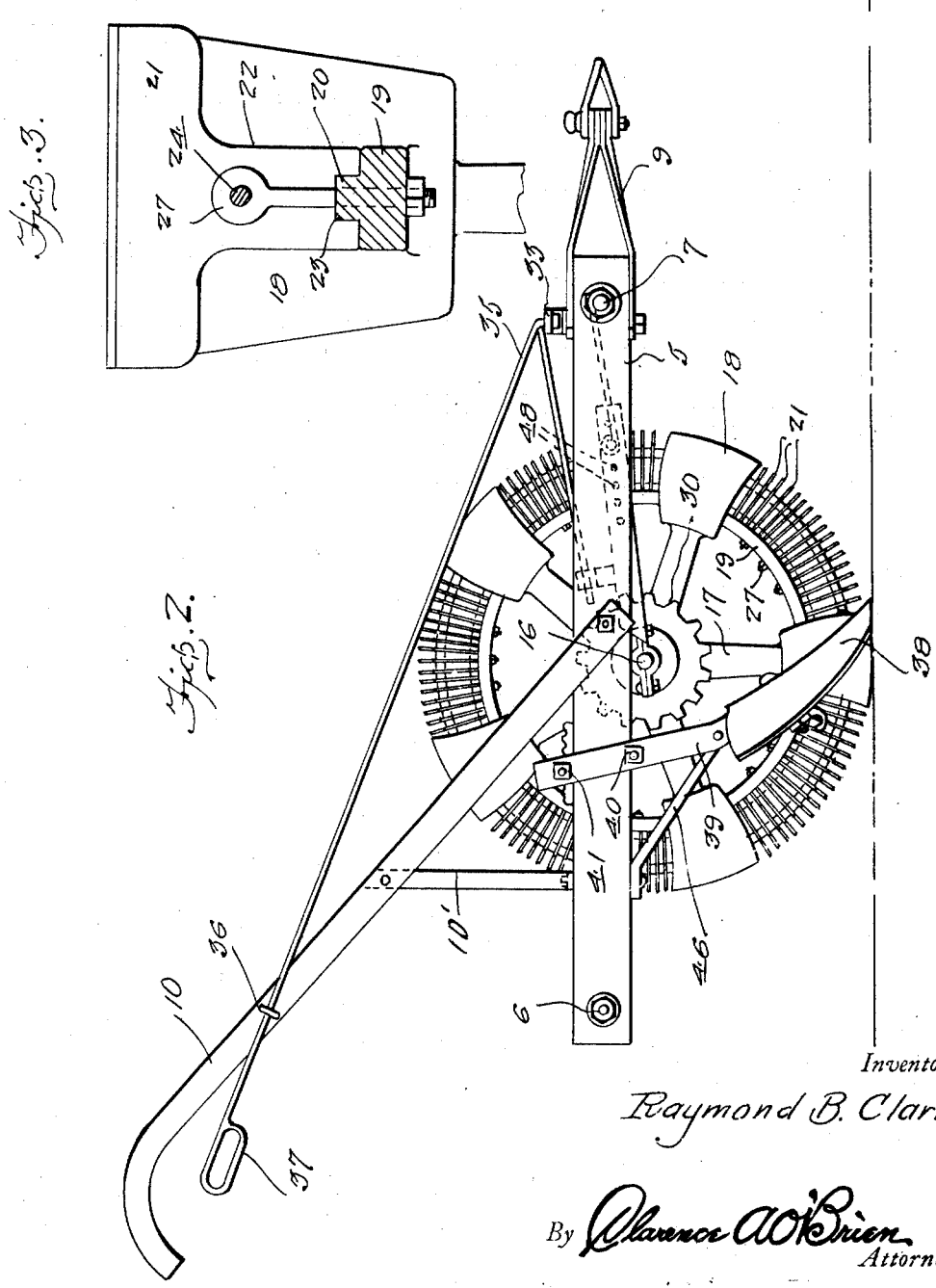
Inventor
Raymond B. Clark
By Clarence A. O'Brien
Attorney Patented Aug. 6, 1929.

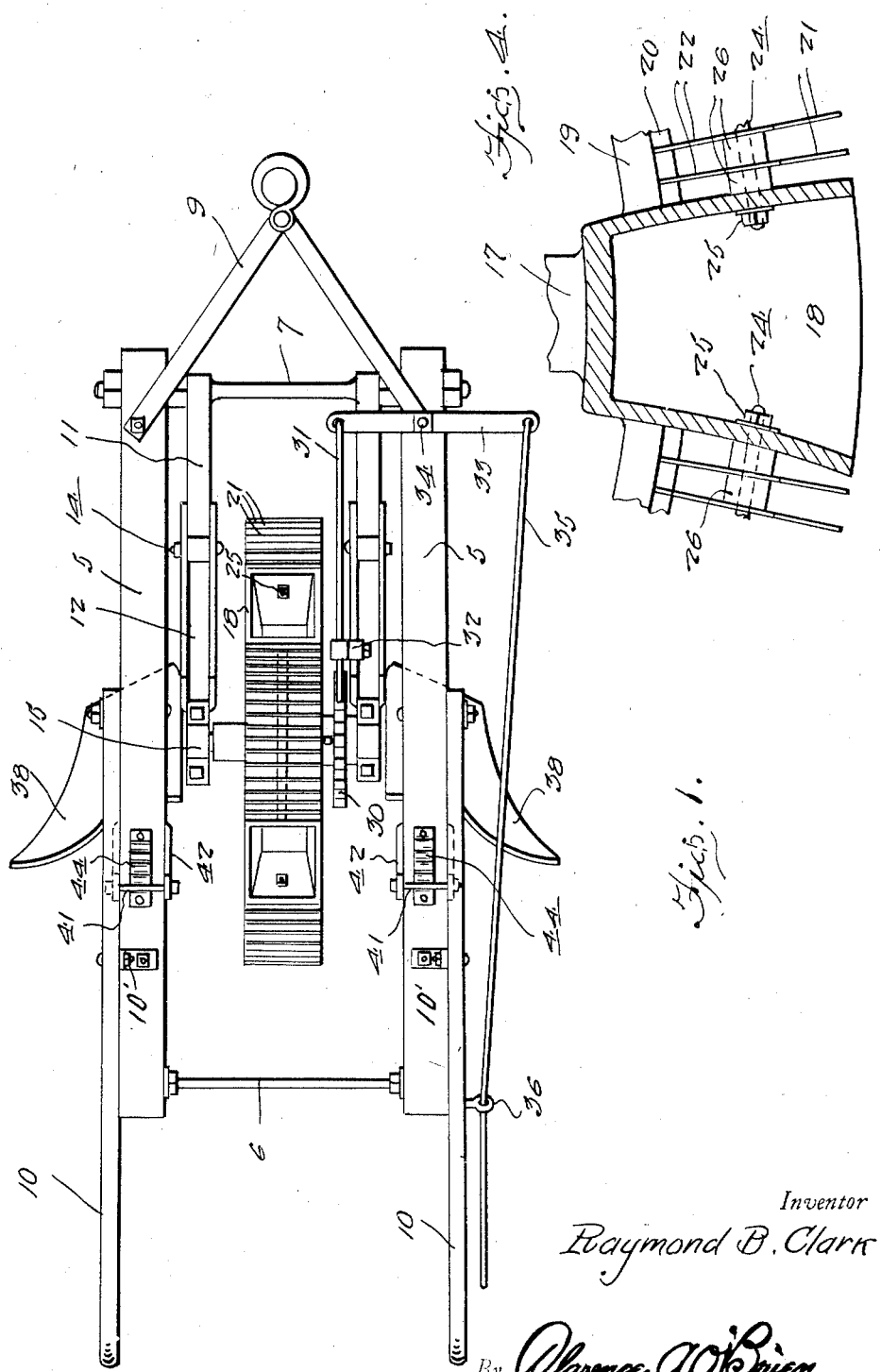

1,723,502

UNITED STATES PATENT OFFICE.

RAYMOND B. CLARK, OF BIRMINGHAM, ALABAMA.

COTTON CHOPPER.

Application filed June 28, 1928. Serial No. 289,024.

The present invention relates to a cotton chopper and has for its prime object to provide an apparatus which may be pulled along a row of cotton and will chop out the cotton except at certain intervals so as to leave separated groups of plants and simultaneously to throw dirt over the sections which are chopped but to protect the group of plants which are left standing from this dirt which is being continuously thrown inwardly.

Another very important object of the invention resides in the provision of a brake mechanism so that the apparatus may be brought to a stop and held stationarily whenever desired.

A still further very important object of the invention resides in the provision of a rotary chopper with a horizontal transverse axis.

A still further very important object of the invention resides in the provision of a rotary cotton chopper of this nature which is mounted so that various adjustments may be readily made for controlling the position relationship of a pair of plows one on each side of the chopper and further in the provision of means for adjusting the plows.

A further very important object of the invention resides in the provision of an apparatus of this nature which is simple in its construction, inexpensive to manufacture, strong and durable, compact and convenient in its arrangement of parts, thoroughly efficient and reliable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a top plan view of the apparatus embodying the features of my invention, Figure 2 is a side elevation thereof, Figure 3 is a transverse section through the rim of the rotary chopper, and Figure 4 is an enlarged detail section through one of the cups thereof.

Referring to the drawing in detail it will be seen the numeral 5 denotes two spaced parallel coextensive frame bars held in spaced relation by bars 6 and 7. A suitable hitch structure 9 is engaged with the forward end of the bars 5.

Suitable handles 10 are engaged with the rear portions of the bars to incline upwardly and rearwardly and are braced in respect to the bars as indicated at 10'. A pair of arms 11 are engaged on the rods 7 and extend rearwardly and are pivotally engaged with channel arms 12 by bolts 14.

These channel arms 12 have bearings 15 at their rear ends for receiving ends of an axle shaft 16 which is rotatable therein and has a plurality of spokes 17 radiating therefrom to support cups 18 with arcuate rim sections 19 extending therebetween adjacent their inner closed end.

The rim sections 19 are formed with ribs 20. A plurality of chopper blades 21 have shanks 22 with notches 23 in their ends to receive the ribs 20. Arcuate bolts 24 extend between the cup 18 and are anchored to the cups by nuts 25. These bolts 24 extend through openings in the outer portion of the shank 22 and have spaces 26 thereon one between each adjacent pair of blades and between the cups and adjacent blades.

Eye bolts 27 radiate outwardly from the sections 19, a plurality of sections and the bolts 24 extend through the eyes thereof to be braced thereby. Thus a very sturdy and rigid assembly is provided for the chopper blade on the rotary chopper structure.

On the shaft 16 there is a cog wheel 30. A rod 31 is slidable through a bracket 32 on the arm 12 adjacent the cog wheel to engage between the cogs thereof and thereby function as a brace for the rotary cutter. A lever 33 is pivotally mounted intermediate its ends as at 34 on the forward end of one of the bars 5 and the bar 31 is engaged with the inner end thereof and a rod 35 is engaged with the outer end thereof and extends through an eye bolt 36 on one of the handles 10 and terminates in a loop 37 so that by pushing on this rod 35 the brake may be applied that is the rear end of the rod 31 may be projected through the cogs of the cog wheel thus positively stopping the rotary motion in the rotary chopper.

A pair of plows 38 have shanks or standards 39 rising to the outer sides of the frame bars 5 to the rear of the axle 16 and bolts 40 and 41 straddle the frame bars extending inwardly through plates 42 on the inner sides of the bars so that the standards 39 may be clamped to the frame bars.

Notched plates 44 are arranged on the bars 5 so that the bolts 41 may be engaged therewith to hold the standards 39 in different angles in respect to the bars 5 as may be desired. The standards are braced as indicated at 46.

It is to be noted that the bolts 14 may be inserted in any of the openings provided in the sides of the channel arm 12 there being a plurality of such openings for each channel arm as is indicated at 48 in Figure 2 so that the shaft 16 may be shifted forwardly or rearwardly thus disposing the cup adjacent the ground in a protecting position exactly as may be desired with respect to the plows 38.

From the above detailed description it will be seen that as this apparatus is moved along the rows of cotton the cup 18 protects certain grouped plants but the remaining plants are chopped up by the numerous knives 21 and the chopped up cotton plants are covered by dirt thrown inwardly by the plows 38.

It is thought that the construction, operation, utility and advantages of the invention will now be quite apparent to those skilled in this art without a more detailed description thereof. The present embodiment of the invention has been disclosed in detail merely by way of example since in actual practice it attains the features of advantage enumerated as desirable in the statement of the invention and the above description.

It is apparent that changes in the details of construction, and in the combination and arrangement of parts may be resorted to without departing from the spirit or the scope of the invention as hereinafter claimed or sacrificing any of its advantages.

Having thus described my invention, what I claim as new is:

1. A rotary chopper of the class described including a plurality of spokes, cups at the ends of the spokes, rim sections between the cups provided with ribs, bolts between the cups, a plurality of blades through which the bolts extend, said blades having notches at their inner ends for receiving the ribs.

2. A rotary chopper of the class described including a plurality of spokes, cups at the ends of the spokes, rim sections between the cups provided with ribs, bolts between the cups, a plurality of blades through which the bolts extend, said blades having notches at their inner ends for receiving the ribs, said sections having ribs in the notches, means for holding the blades in spaced relation to each other and in spaced relation to the cups.

3. In an apparatus of the class described, comprising a frame, a rotary chopper member mounted in the frame and including a plurality of cups and a plurality of blades disposed between the cups, and dependable means disposed between said cups for securing said blades in position, said means comprising a plurality of rim sections between the cups, a plurality of bolts between the cups, each blade including a shank through which a bolt extends, each rim section including a rib and each shank having a notch to receive the said rib.

4. In an apparatus of the class described, comprising a frame, a rotary chopper member mounted in the frame and including a plurality of cups and a plurality of blades disposed between the cups, and dependable means disposed between said cups for securing said blades in position, said means comprising a plurality of rim sections between the cups, a plurality of bolts between the cups, each blade including a shank through which a bolt extends, each rim section including a rib and each shank having a notch to receive the rib, and a plurality of eye botls extending from the rim section and through which the bolts between the cups are adapted to extend.

5. In an apparatus described comprising a frame, a rotary chopper mounted in the frame and including a plurality of cups and a plurality of blades disposed between the cups, a pair of plow elements for directing dirt inwardly, one being disposed at each side of the rotary chopper, means for adjusting the axis of the rotary chopper in respect to the plow, said means consisting of a channeled bar projecting from the hub portion of the chopper, a bar projecting from one end of the frame toward the chopper, the inner end of the last mentioned bar being pivotally connected to said channeled bar within its channel.

In testimony whereof I affix my signature.

RAYMOND B. CLARK.